United States Patent [19]

Lona

[11] Patent Number: 4,777,905
[45] Date of Patent: Oct. 18, 1988

[54] APPARATUS FOR THE REPAIR OF PIPES

[75] Inventor: Norbert Lona, Rorschacherberg, Switzerland

[73] Assignee: Futurtech, Vaduz, Liechtenstein

[21] Appl. No.: 21,370

[22] Filed: Mar. 3, 1987

[30] Foreign Application Priority Data

Mar. 3, 1986 [CH] Switzerland ............... 874/86

[51] Int. Cl.⁴ .................. B05C 7/08; B05C 11/04
[52] U.S. Cl. .................. 118/105; 118/112; 118/306; 118/DIG. 10
[58] Field of Search ............ 118/105, 112, DIG. 10, 118/408, 306

[56] References Cited

U.S. PATENT DOCUMENTS

| 2,704,873 | 3/1955 | Kirwan et al. | 118/105 X |
| 3,113,365 | 12/1963 | Ruegsegger | 118/105 X |
| 3,810,441 | 5/1974 | Padgett et al. | 118/105 |
| 3,960,644 | 6/1976 | McFadden | 118/306 X |
| 3,966,389 | 6/1976 | Shubert | 118/105 X |

FOREIGN PATENT DOCUMENTS

| 3429881 | 2/1986 | Fed. Rep. of Germany . |
| 2371242 | 4/1977 | France . |
| 1243613 | 8/1971 | United Kingdom . |
| 2150050A | 6/1985 | United Kingdom . |

Primary Examiner—John P. McIntosh
Attorney, Agent, or Firm—Browdy and Neimark

[57] ABSTRACT

A carriage (1) is guided coaxially to the axis (11) of a pipe (9) to be repaired by two sets (2, 3) of sprung rollers (4, 5). The carriage supports a drive motor (28), on the drive shaft (29, 30) of which is fixed a distributor means in the form of rollers (41). Coating material, for example a pressure setting plastic, is applied via a supply pipe (45) to the underside of the pipe wall (8) and is distributed by the turning rollers (41) over the circumference. In this way damaged sewer pipes can be correctly coated with small effort.

6 Claims, 2 Drawing Sheets

4,777,905

APPARATUS FOR THE REPAIR OF PIPES

BACKGROUND OF THE INVENTION

From British Pat. No. GB-A 1 243 613 an apparatus is known having a carriage guided on wheels distributed around its circumference with a reservoir for sealing material and a compressed air motor which drives a rotating trowel. The sealing material is fed to the trowel from the reservoir via a pump and flexible rotating hoses. The connections of a pipeline which are to be sealed can be detected by means of a sensor. The apparatus can be pushed into the desired position in the pipeline along a supply pipe for the compressed air. This known apparatus is suitable for the sealing of connections of a gas main made from metal. It is not suitable for the repair of sewer pipes because of the limited capacity of the reservoir.

An apparatus intended for the same purpose and having radially flexible rollers distributed around the circumference is known from British Pat. No. GB-A 1 591 409. This apparatus also has a reservoir for the sealing material to be applied to the connections of a pipeline. The sealing material is sprayed on by means of a rotating nozzle.

German Pat. No. DE-A 3 429 881 describes an apparatus for the repair of sewer pipes. It comprises a carriage with two driven wheels and a steerable guiding wheel. Coating material is supplied to a container via a hose, is mixed with a hardener and brought to a spinner. The material applied by the spinning action is smoothed by rotating smoothing paddles. This apparatus is complicated, prone to breakdowns and hard to clean.

A further apparatus for the coating of a pipe is known from British pat. No. GB-A 2 150 050. According to this, a carriage is provided with three sets of wheels which are evenly distributed around the circumference. One of the three sets of wheels is driven by a motor. On its end the carriage has a compressed air motor with a spinner which applies the coating material to the wall of the pipe by spinning.

Further devices for the coating of pipes are known from U.S. Pat. Nos. 3,810,441 and 3,960,644.

In all these known devices the coating material is applied directly to the entire circumference of the pipe by spinning or spraying or supplied by a rotating trowel to its entire circumference. This causes problems because of dirtying of the carriage which must be cleaned after every use.

SUMMARY OF THE INVENTION

It is an object of the present invention to provide an improved apparatus for the coating of the inner wall of pipes with a flowable coating material, comprising a carriage guided on a set of rollers having a connection on its front end connecting to a supply hose for the coating material and a motor with a drive shaft, on the rear end of which is fastened a distributing element, in such a way that it is simple, little prone to breakdowns and easy to maintain.

BRIEF DESCRIPTION OF THE DRAWINGS

An exemplary embodiment of the invention is further described by means of the drawings, which show in.

DETAILED DESCRIPTION OF THE PREFERRED EMBODIMENT

Figure 1:
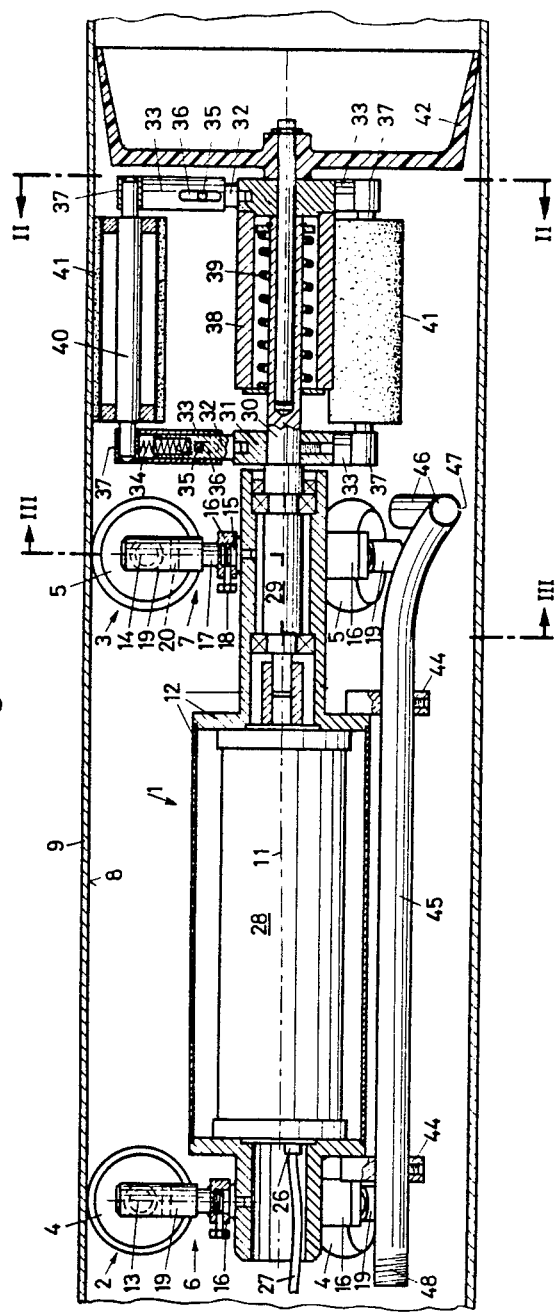
FIG. 1 a longitudinal section through an apparatus according to the invention.
Figure 2:
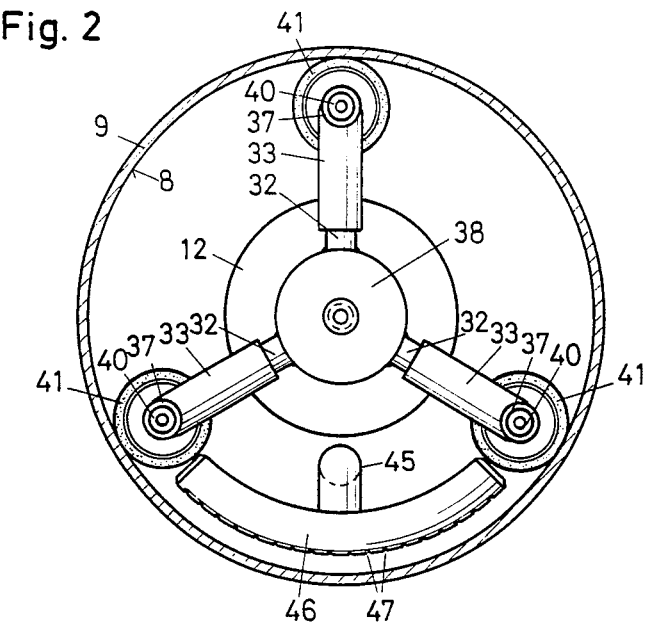
FIG. 2 a section along the line II—II of FIG. 1.
Figure 3:
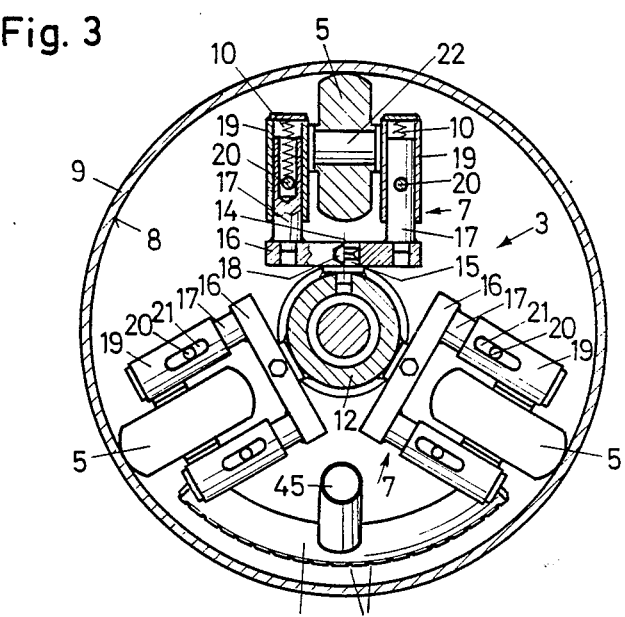
FIG. 3 a cross section along the line III—III of FIG. 1.

The apparatus shown comprises a carriage 1 with two sets 2, 3 of three guide rollers respectively. The rollers 4, 5 are fixed in radially telescoping flexible supports 6, 7 so as to be movable and are braced against the wall 8 of the pipe 9 which is to be coated. The longitudinal axis 11 of the carriage 1 is centered in the pipe 9 by means of the springs 10 (FIG. 3) of the supports 6, 7. The supports 6, 7 are pivotable around axles 13, 14, which are disposed vertically to the longitudinal axis 11 and are arrestingly connected with the housing 12. For this reason three radially extending bolts 15 for each set 2, 3 have been welded to the housing 12. A support plate 16 having two pins 17 extending parallel to the axle 14 is pivotable on the bolts 15 respectively and secured and arrested by a screw 18. Sleeves 19 are set on the pins 17 and are secured with transverse pins 20 which extend through slotted holes 21 in the sleeves 19. The two sleeves 19 are radially outwardly stressed by the springs 10 and bear the axle 22 of the wheel 5.

A DC-drive motor 28, with reversible direction of rotation and having a plug 26 for a connecting cable 27, is fixed in the housing 12, the drive shaft 29 of which extends coaxially with the longitudinal axis 11 of the carriage 1 and protrudes out of the rear end of the housing 12. A ring 31 having three radially extending bolts 32 is rigidly fixed next to the housing 12 on the shaft end 30. Longitudinally displaceable sleeves 33 are fastened on the bolts 32 and are stressed radially outwardly by springs 34. The sleeves 33 are respectively secured against turning on the bolts 32 by a pin 35 pushed through a transverse bore of the bolt 32 and a longitudinal slit 36. The sleeves 33 have on their free ends a bearing 37 with a bearing hole extending parallel to the axis 11.

A spring cage 38, axially displaceable but secured against turning, is disposed on the shaft end 30 and is prestressed in the direction of the housing 12 by a spring 39. The cage 38 has three further bolts 32 on its free end, having sleeves 33 and bearings 37. The shaft 40 of a felt roller 41 is supported in respectively two axially aligned bearings 37. A freely pivotable smoothing tool 42 in the form of a truncated cone is disposed on the shaft end 30.

A pipe 45 for the supply of coating material, for example a pressure setting plastic, is supported by supports 44 underneath the housing 12. The pipe 45 has on one end between the rollers 41 and the set of wheels 3 an orifice arch 46 in the form of a segment of a circle with a plurality of radial orifice openings 47. At the opposite end the pipe 45 has a thread 48 for attaching a hose coupling.

Before repairing, a sewer pipe 9 is cleaned, if necessary by removing strongly adhering deposits by means of a known cutter for this purpose, and then dried with warm air. The apparatus described is of such a size that it can be brought, with the set of wheels 2 at the front, into the pipe 9 through a shaft. The cable 27 is drawn through the pipe 9 from the next shaft and coupled. Further, a hose for the coating material is drawn in and connected with the hose coupling on the thread 48. Then the carriage 1 is slowly drawn through the pipe 9 by the hose while at the same time coating material is supplied through the hose and is applied to the lower part of the pipe 9 via the opening 47. The motor 28 drives the shaft 29 and the rollers 41 evenly distribute the coating material over the inner wall 8 of the pipe 9. The smoothing cone 42 which follows completely evens out any irregularities still present and a smooth coating is the result.

The force of the back pressure acting on the housing 12 can be absorbed by a slight tilting of some or all of the rollers 4, 5. This will assure that the pipe 45 remains approximately on the underside of the carrier 1. A slight deviation from this position is allowable and is seldom exceeded during the relative short distances of at most 30 m between the shafts. Should this nevertheless occur, the direction of turning of the motor can be reversed in order to return the carriage to its normal position. The reversal of the direction of turning is also useful should the rollers 41 catch, for example because of a deposit in the pipe 9 which has not been removed.

If the apparatus is to be used over longer distances it would also be possible to automatically set the track of the wheels 4, 5 of one of the set of wheels 2, 3, for example controlled by an inclination switch.

After the carriage 1 has traversed the pipe 9, the latter is evenly coated with a layer of the coating material. The thickness of the layer can, within certain limits, be varied by the amount of coating material applied per running foot. If heavier layers are desired, a further layer can be applied after the first layer has set.

If the pipe 9 should have small openings on its sides between two shafts, they are not blocked during the coating of the pipe, in contrast to the lining with hoses mentioned above, where the hoses have to be drilled open after application over these openings, which usually is very expensive. Because of these side openings the disposal of three instead of four or more wheels per set is especially advantageous, because it can be avoided with this arrangement that a wheel gets trapped in one of these openings and thereby blocks the carriage 1. By means of the apparatus it is also easily possible to repair merely local areas of damage which were located by using, for example, a television set for observing the sewer system.

To exchange the rollers 41, the spring cage 38 is pulled against the force of the spring 39 so that the rollers 41 can be taken out of the bearings 37 and other rollers inserted.

Figure 4:
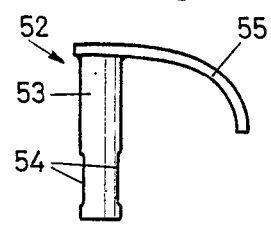
FIGS. 4 and 5 another variant of the distributing element in front and side views.
Figure 5:
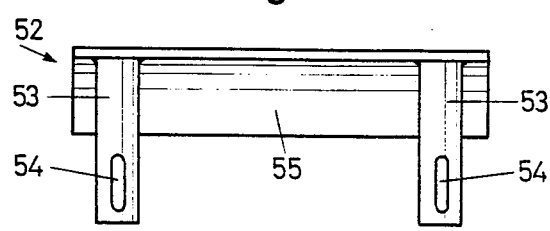

Depending on the coating material, a distribution means other than the rollers 41 might be practical, for instance the trowel 52 shown in FIGS. 4 and 5. To use this, first the rollers 41 are removed and then, after dismantling of the pins 35 the sleeves 33 are removed. The spring cage 38 is pulled out far enough that the distance between the bolts 32 corresponds to the distance between two sleeves 53 of the trowel 52. The sleeves 53 are inserted over the bolts 32 and are again secured by means of the pins 35 pushed through the slotted holes 54. In this variant a curved piece of sheet metal 55 distributes the coating material over the circumference of the inner wall 8 and smoothe it.

To make possible the coating of pipes 9 with larger diameters, the wheel sets 2, 3 can be exchanged for wheel sets with longer pins 17 after loosening the screws 18. The sleeves 33 of the distribution means must be exchanged with correspondingly longer sleeves.

Instead of pulling the carriage by the hose, a coupling for a pull rope can be provided at the front of the housing 12. Runners can be provided in place of the the rollers 4, 5. In this case the motor 28 would have to be run alternately to the left and to the right in order to keep the carriage 1 approximately in a position with the pipe 45 at its underside. It would alternatively also be possible to provide two distribution means turning in opposite directions behind each other.

It is to be understood that the embodiments described above are only by way of example and that further improvements and alternative embodiments are possible within the scope of the invention.

What is claimed is:

1. An apparatus for the coating of the inner wall of pipes with a flowable coating material, comprising a carriage guided on at least one set of rollers and having
a motor with a drive shaft on the rear end of which is fastened a distributing means,
wherein a first set of said rollers is disposed in the vicinity of the front end of the carriage and a second set of said rollers is disposed in front of the distribution means, each said set comprising three rollers which are movable in a radial direction against the action of springs such that the carriage is spring centered against the pipe, a connector for supplying the flowable material to the pipe is connected to the carriage with a discharge opening located at the underside of the carriage and between said at least one set of rollers and the distribution means for discharging the flowable coating material only at the underside of the carriage.

2. An apparatus in accordance with claim 1 wherein each of said rollers has a turning axle and the turning axles of at least two of the rollers are adapted to be set and fixed on radial pivot axles.

3. An apparatus in accordance with claim 1 wherein the direction of turning of the motor is reversible.

4. An apparatus in accordance with claim 1 wherein the distribution means is fixed removably and exchangeably on a support.

5. An apparatus in accordance with claim 4, wherein the distribution means includes several turnable rollers, each being radially flexible with respect to the support.

6. An apparatus in accordance with claim 1 wherein a smoothing tool in the form of a truncated cone is disposed behind the distributing means, said smoothing tool turning around the axis of the drive shaft.

* * * * *